June 15, 1954 R. K. ORTHUBER 2,681,380

COLOR TELEVISION PROJECTION SYSTEM

Filed Sept. 26, 1951 4 Sheets-Sheet 1

INVENTOR.
RICHARD K. ORTHUBER
BY James S. Shannon
AGENT
Wade Koontz
ATTORNEYS

INVENTOR.
RICHARD K. ORTHUBER
BY James S. Shannon
AGENT.
Wade Koontz
ATTORNEY

INVENTOR.
RICHARD K. ORTHUBER
BY James S. Shannon
AGENT
Wade Koontz
ATTORNEY

June 15, 1954 R. K. ORTHUBER 2,681,380

COLOR TELEVISION PROJECTION SYSTEM

Filed Sept. 26, 1951 4 Sheets-Sheet 4

INVENTOR.
RICHARD K. ORTHUBER
BY James S. Shannon
AGENT
Wade Koontz
ATTORNEY

Patented June 15, 1954

2,681,380

UNITED STATES PATENT OFFICE 2,681,380

COLOR TELEVISION PROJECTION SYSTEM

Richard K. Orthuber, Fort Wayne, Ind., assignor to the United States of America as represented by the Secretary of the Air Force Application September 26, 1951, Serial No. 248,439

3 Claims. (Cl. 178—5.4)

(Granted under Title 35, U. S. Code (1952), sec. 266)

The invention described herein may be manufactured and used by or for the Government for governmental purposes without the payment of any royalty thereon.

This application is a continuation in part of my application Serial No. 240,772 filed August 7, 1951.

This invention relates to systems for the optical projection of the picture information contained in a color video signal.

At present, cathode-ray projection tubes generally employ a fluorescent screen which must be excited at a high level in order to produce an image of sufficient brightness to be projected. Such tubes require very high acceleration voltages and current densities to obtain the necessary high level excitation of the phosphor, which in turn has a comparatively short life.

It is the object of this invention to provide a projection system for color television in which the cathode-ray tube does not employ the usual fluorescent screen and in which an external source of light, such as a conventional projection lamp and condensing lens system, may be used. Briefly the cathode-ray tube used in the projection system contains, in place of a fluorescent screen, an element which may be termed an electrostatic shutter mosaic. The mosaic consists of a multitude of flaps of elemental size mounted on a substrate which may be either transparent or opaque. The electronic beam is caused to scan over the mosaic or else over a transparent dielectric element placed opposite and close to the mosaic so as to control the charge on or in the vicinity of the flaps. The resulting electrostatic force acting on each flap causes a bending thereof in proportion to the strength of the force. A projection lens system is used to form an image of the mosaic on the screen. The mosaic is illuminated with light of the three primary colors, red, green and blue, from three light sources positioned to have different angles of incidence relative to the mosaic. Circuit means are provided for generating three bias voltages of different amplitudes each corresponding to and being in synchronism with one of the three primary color transmissions of the video signal. The bias voltages are applied to the beam intensity control electrode of the cathode ray tube and, by fixing the beam intensity, serve to fix the angular position of the mosaic flaps so that during the transmission of each of the three color signals only light from the light source of corresponding color is reflected into the projection lens by the flaps, which act as small mirrors. Variations in amplitude of the video signal cause variation in the angular positions of the flaps from those established by the bias voltages and thus vary the amount of light from the light sources that is reflected into the projection lens. For field sequential transmission, the bias voltages are switched at field frequency; whereas for line and dot sequential transmissions the switching takes place at line and dot frequencies, respectively. Suitable projection tubes of the above type are claimed in the parent application and in my application Ser. No. 318,144, filed October 31, 1952.

The brightness of the projected image obtainable with the projection system in accordance with the invention is substantially higher than the brightness produced with fluorescent screens, since a light source of any desired intensity may be used. Further, accelerating voltages and beam current intensities required are no higher than for conventional cathode ray tubes of the direct viewing type. The disclosed color projection system also has the advantage over the fluorescent type projection tube that, when the picture consists of a succession of frames, the flicker is materially reduced due to the fact that the brightness during one frame period is constant and does not decay exponentially as in the case of fluorescent materials. A more detailed explanation of the invention will be given in connection with the specific embodiments thereof shown in the accompanying drawings, in which:

Fig. 1 shows a projection tube having an electrostatic shutter mosaic.

Figs. 2 and 2*a* show details of the electrostatic shutter mosaic.

Figures 1, 2, 2A, 3, 4, 5:
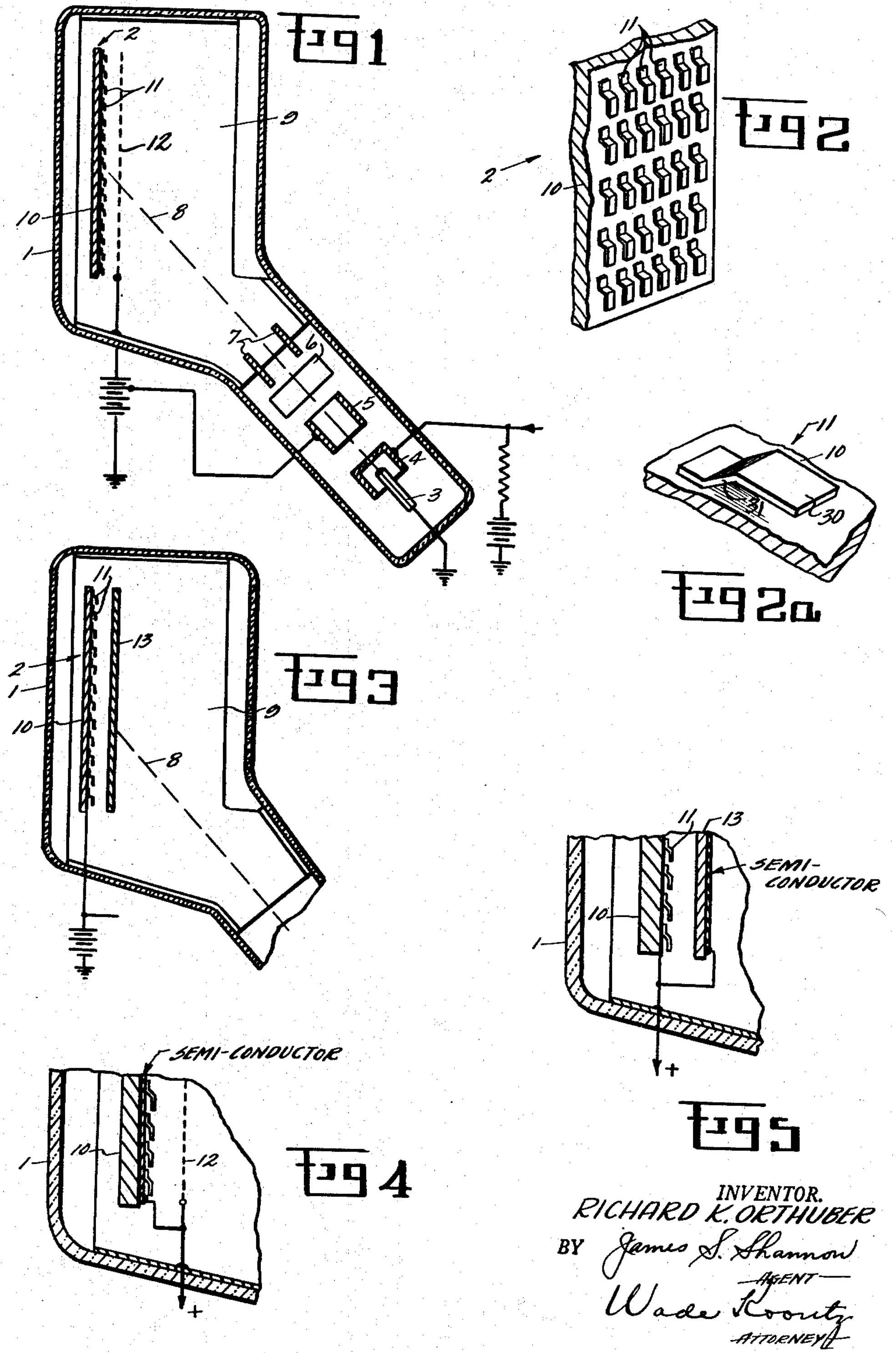
Fig. 3 shows a projection tube using a mosaic having a conductive substrate.
Figs. 4 and 5 show methods of erasing charges from the mosaic by the use of semiconductors.

Referring to Fig. 1 the cathode-ray tube shown comprises a glass envelope 1 containing an electrostatic shutter mosaic 2, a cathode 3, a control electrode 4, accelerating and beam forming electrode 5, horizontal deflecting electrode 6 and vertical deflecting electrode 7. The electrodes cooperate to produce an electron beam 8 which is intensity modulated in accordance with a video signal applied to the electrode 4 and which line scans the surface of the mosaic 2 in the conventional manner. The tube is also provided with a conventional conductive coating 9 on its inner surface which is maintained at a high potential relative to the cathode. The coating is not present on the surfaces of the tube opposite the mosaic so as to provide transparent windows in the tube to permit projection of an image of the mosaic.

The details of the mosaic 2 are more clearly illustrated in Fig. 2 which shows a greatly enlarged fragment thereof. The mosaic comprises a substrate 10 on which are mounted a multitude of minute flaps 11 uniformly distributed over the surface of the substrate, preferably in straight horizontal rows. In general, the number of such rows in the mosaic should be at least equal to and preferably higher than the number of horizontal scanning lines contained in one complete frame in the particular television system, and the dimensions of the flaps should be roughly equal to the height of the mosaic divided by the number of lines. However, if less resolving power is required a smaller number of flaps of larger dimensions located in fewer horizontal rows may be employed. The substrate 10 may be transparent or opaque, conductive or nonconductive, dependent partly upon the type optical system employed, as will be pointed out later. Mica and glass are suitable materials for a nonconductive transparent substrate, whereas a conductive opaque substrate may be made of a suitable metal such as aluminum. If a transparent conductive substrate is desired the substrate may be made of glass coated with a thin transparent coating of metal on which the flaps are mounted. The flaps 11 are made of metal such as aluminum, are preferably of rectangular shape and are connected to the substrate at one edge only. The ratio of thickness to length of the flaps is chosen so low that, by means of electric charges applied to them by the electron beam of the tube or acting on them, they can be bent to an amount detectable with the optical systems to be described later.

A suitable form for the flaps is shown in more detail in Fig. 2*a*. The portion 30 is preferably rectangular and, since the flap is to be used as a reflector, should also be flat. The flap is connected to the substrate 10 along one edge by flexible connecting part 31. The thickness of part 31 is preferably made less than the thickness of part 30 in order that substantially all of the bending will occur in part 31. This is particularly desirable when the flap acts as a reflector. Methods for making mosaics of this type are described and claimed in my joint applications Serial Nos. 269,569, 269,570, and 269,571, filed February 1, 1952.

The arrangement in Fig. 1 is for use with a substrate of insulating material. In this arrangement the beam impinges directly upon the flaps 11. If the energy in the beam is made such that the yield of secondary electrons is less than one for each primary electron each flap will be negatively charged by an amount proportional to the intensity of the beam when it impinges thereon. The attractive force between the negatively charged flaps and the positively charged screen 12, made of fine wire and positioned parallel to the mosaic 2, causes a bending of each flap in accordance with the degree of its negative charge.

The charging electron beam need not necessarily impinge directly upon the flaps but may also be used to generate an electric field in a capacitor formed by a thin insulating sheet positioned in front of the flaps and close to them. Such an arrangement is shown in Fig. 3. A sheet of insulating material 13 such as mica or glass is positioned parallel to and close to the mosaic 2. The beam 8 scans over the sheet 13 and produces a negative charge thereon which varies over the surface of the sheet in accordance with variations in the video modulation of the electron beam. The bending of each flap 11 is determined by the charge density on that part of sheet 12 opposite the particular flap. The flaps on the mosaic 2 therefore will be bent in varying amounts in accordance with the electron or charge density image on sheet 13. In this case the flaps 11 of mosaic 2 are mounted directly on a conductive surface on substrate 10 which is in turn connected to a point of high positive potential. The substrate may be either transparent or opaque as required by the arrangement of the optical system. As already stated, for the transparent type the substrate may be made of a transparent insulating material such as glass having a thin transparent metallic coating on which the flaps are mounted. An opaque substrate may consist simply of a sheet of metal.

If the video signal applied to the above cathode-ray tubes represents a changing image occurring in successive frames, as in a television signal, the charges applied to the mosaic, as in Fig. 1, or to the insulating sheet 13, as in Fig. 3, must be erased between frames and the charge-taking element returned to its reference potential. This can be achieved by the use of a semiconductor to allow the charges to leak off between frames. For the arrangement of Fig. 1 a thin semiconductive layer connected to the positive inner surface of the tube is placed between the substrate 10 and flaps 11, as shown in Fig. 4. For the arrangement of Fig. 3, a thin transparent layer of semiconductive material is placed over the surface of insulating sheet 13 and connected to the positive inner surface of the tube as shown in Fig. 5. Suitable semiconductive materials for this purpose are silenium, lead sulphide and silicon.

Figures 6, 12:
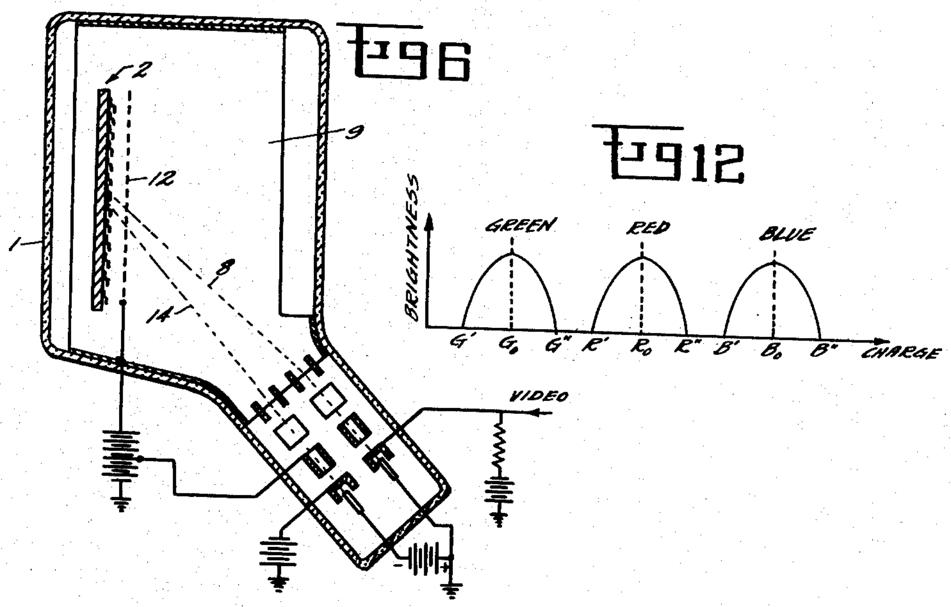
Fig. 6 shows a method of erasure using an electron beam.
Fig. 12 illustrates graphically the operation of the projection system of Fig. 9.

Another method of erasing charges between frames employs an erasing electron beam for this purpose. Fig. 6 shows this method as applied to the arrangement of Fig. 1. The tube in Fig. 6 is similar to that in Fig. 1 except that it is provided with two complete beam generating or deflecting systems. The beam 8 is the writing beam and serves the same function as in Fig. 1. Its energy is such that the ratio of secondary electrons to primary electrons is less than unity with the result that the flaps 11 are charged negatively by the beam. The erasing beam 14, however, produced by the other electron beam system, has sufficiently high energy that the secondary electron ratio in its case is greater than unity. The effect of beam 14 on the flaps therefore is to charge them positively since they lose more secondary electrons than the number of primary electrons received. By this process the potential of each flap is raised to that of screen 12 at which point secondary emission is suppressed and the potential of the flap stabilized. By arranging the deflecting voltages for beam 14 so that the beam precedes beam 8 by a short interval, such as one or two periods of the horizontal sweep frequency, each flap of the mosaic is restored to the reference potential shortly before being subjected to the writing beam 8.

Other means of image erasure are also possible. For example, illumination of the charge receiving element with ultraviolet or shorter wavelength radiation between frames can effect discharge thereof by photo-emission.

Figure 7:
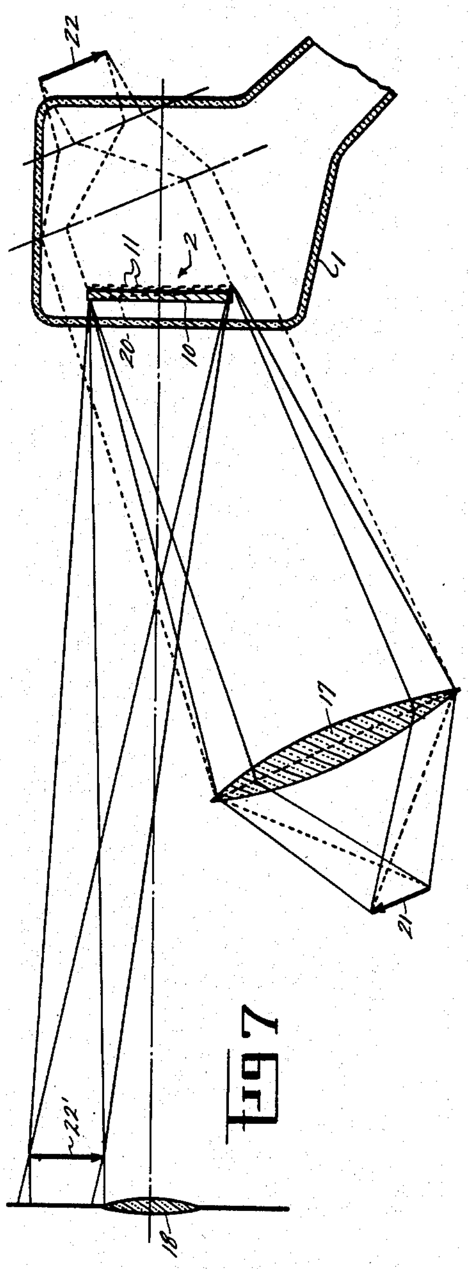
Figs. 7 and 8 show the optical principles involved in projecting an image by the use of a cathode-ray tube with an electrostatic shutter mosaic in which the flaps of the mosaic act as small mirrors.
Figure 8:
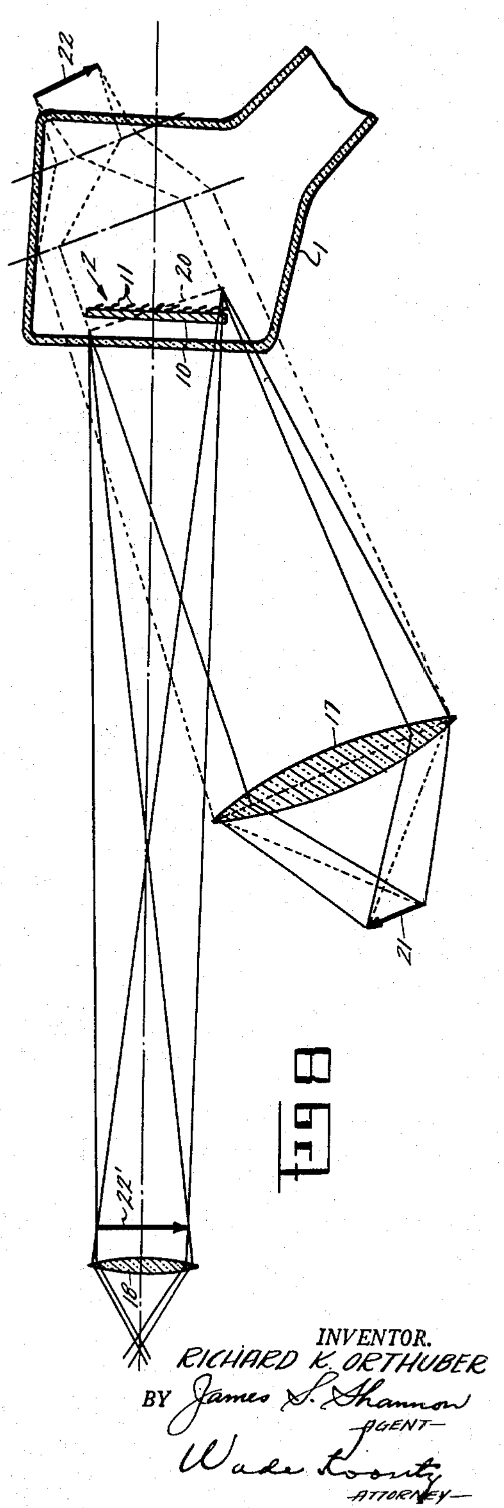

The basic principles of the optical system used in the color television projection system herein described are illustrated in Figs. 7 and 8. The flaps 11 must be flat and capable of specular light reflection. In addition, it is necessary that all flaps be parallel to each other when all are at the reference potential, however, they need not necessarily be parallel to the substrate in their rest position. This method of projection is applicable to mosaics with either transparent or opaque substrates, however, in Figs. 7 and 8 the application is to a tube having a transparent mosaic as in Fig. 1.

Referring to Fig. 7, if all flaps are parallel in their rest positions as specified above, the flap array acts like a single plane mirror parallel to the flaps. This imaginary reflecting surface is indicated at 20 in Fig. 7. The light from source 21 would normally be focused by condensing lens 17 to an image of the light source at 22. However, interposition of the reflecting surface 20, i. e. the flap array, causes the image to fall at 22'. The projection lens 18 produces an image of the mosaic on a projection screen. The focal lengths of the lenses 17 and 18 are so chosen that the image of the light source 22' falls within or directly behind lens 18. Also the lens 18 should have approximately the same size as the image 22'.

The system is so arranged that when flaps 11 are in their rest or no-signal condition the image 22' is displaced just to one side of the lens 18, as shown in Fig. 7, so that no light from the light source 21 enters the lens and the screen is dark. The arrangement is also such that when all flaps have their maximum negative charge the resulting outward bending thereof, which may be represented by a counterclockwise rotation of reflecting surface 20, is just sufficient to bring the image 22' wholly within the boundaries of lens 18, as shown in Fig. 8, so that the screen has its maximum brilliance.

Actually the image 22' is composed of a multitude of identical superimposed images one of which is contributed by each of the flaps 11 of the mosaic. Hence the action of each individual flap is identical to the action of reflecting surface 20. Therefore, variation of the charge on any flap by the electron beam causes variations in the position of the image 22' due to the particular flap relative to the lens 18, resulting in a corresponding variation in the brightness of the image of the flap on the projection screen. All of the elemental areas of light thus formed constitute an optical image corresponding to the electron image on the mosaic.

The projection system shown in Figs. 7 and 8 is equally applicable to a mosaic having an opaque substrate such as shown in Fig. 3. In this case the light source and projection lens are located on the same side of the mosaic as the electron beam and reflection takes place from the top rather than the bottom surfaces of the flaps. The principle of operation, however, is the same. This arrangement, of course, can also be used with a transparent substrate if desired.

Figure 9:
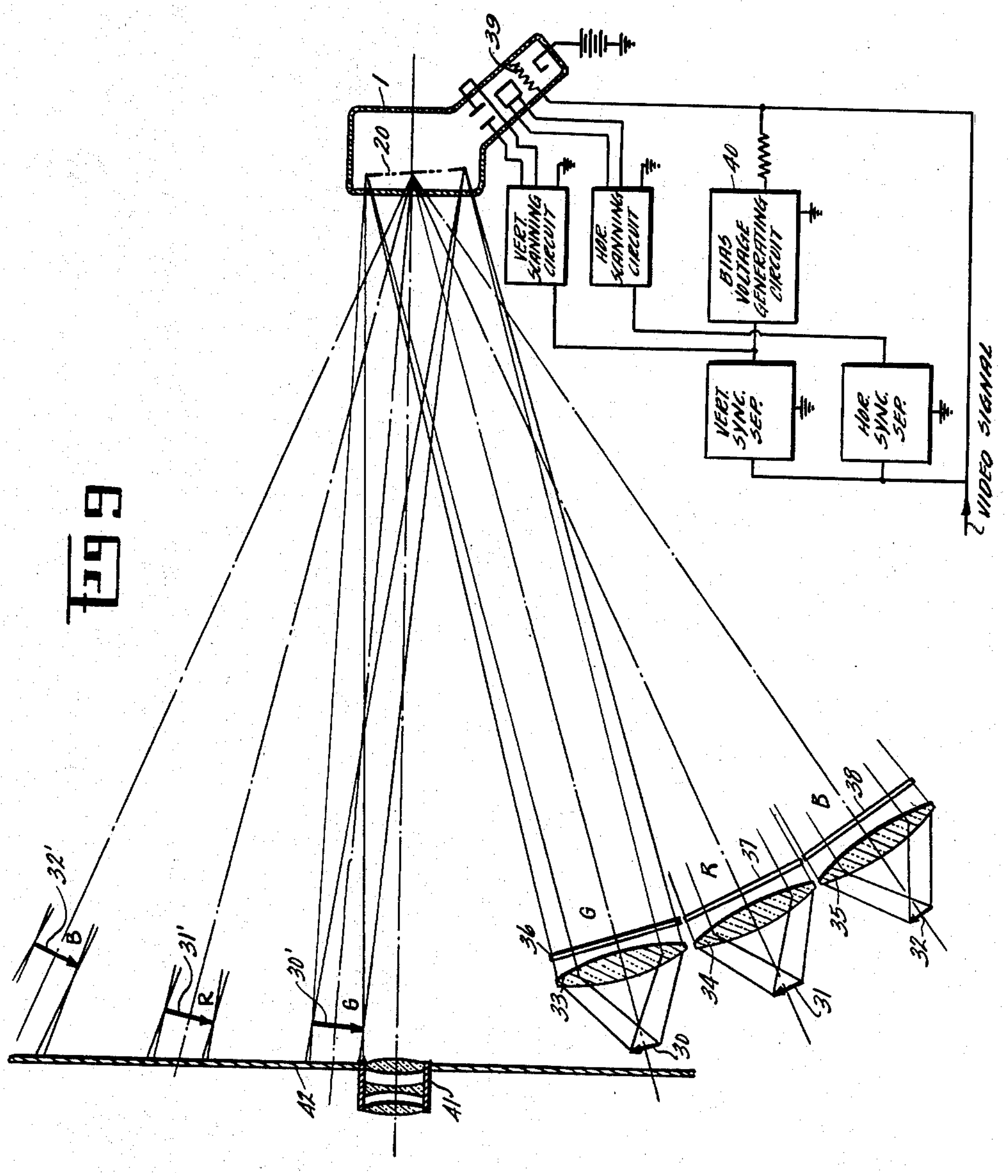
Fig. 9 shows the optical arrangement for the projection of a color image in accordance with the invention.

Fig. 9 shows the method of adapting the projection system of Figs. 7 and 8 to the projection of color television signals. The cathode-ray tube 1 may be of the type shown in Figs. 1 and 4. Instead of a single light source as in Figs. 7 and 8, three light sources 30, 31 and 32 are provided in Fig. 9. Condensing lens systems associated with these light sources are shown at 33, 34 and 35. The light source 30 is provided with a green filter 36, the light source 31 with a red filter 37 and the light source 32 with a blue filter 38. As already explained in connection with the electrostatic shutter mosaic type of cathode ray tube, the angle assumed by the flaps of the mosaic is determined by the intensity of the electron beam. In the illustration of Fig. 9 the beam intensity control electrode 39 of the tube 1 has a fixed bias voltage applied thereto from the bias voltage generating circuit 40 of such value that in the absence of a video signal, all of the flaps of the mosaic assume the angle represented by the line 20. The arrangement is such that for this angular position of the flaps the image 30' of the light source 30 falls just to one side of the projection lens system 41. As in the case of Figs. 7 and 8, the size of the image 30' is made substantially equal to the diameter of the projection lens. An opaque baffle 42 prevents any light from reaching the projection screen under these conditions. The light source 31 has a greater angle of incidence with respect to the mosaic, as represented by line 20, than does the light source 30, and accordingly the image 31' of this light source is still further removed from the lens than the image 30' as shown in the drawing. Similarly the light source 32 has a still greater angle of incidence with respect to the mosaic and its image 32' is still further displaced from the projection lens. The images 30', 31' and 32' are green, red and blue images, respectively, due to the filters associated with their corresponding light sources.

In the projection system of Fig. 9 the line 20 may also represent the reflecting surface of a single flap and the images 30', 31' and 32' may also represent the images of the corresponding light sources produced by a single flap. The projection system is shown in Fig. 9 in condition to receive the green video signal. This signal is applied to the beam intensity control electrode 39 where it is superimposed on the bias voltage applied to this electrode by the bias voltage generating circuit 40. The video signal, which in this case should be positive, increases the intensity of the electron beam in proportion to its amplitude and accordingly produces a further counterclockwise deflection of each flap in the mosaic by an amount dependent upon the intensity of the electron beam at the time it passes over the flap. These angular displacements of the flaps cause the individual images 30', produced by reflections from each of the flaps, to be deflected downward into the cone of acceptance of the projection lens by an amount determined by the instantaneous amplitude of the video signal. Variations in the amplitude of the video signal, therefore, cause more or less light from the images 30' to pass through the projection lens onto the screen.

For the red image, the bias voltage generating circuit 40 produces a bias voltage of higher potential, which increases the intensity of the electron beam and results in a further clockwise rotation of the flaps of the mosaic, as represented by line 20, sufficient to bring the red images 31′ into the position previously occupied by the green images 30′. The red video signal is then applied to the control electrode 39 which causes the images 31′ to be deflected downward still further into the cone of acceptance of the projection lens in greater or less amounts, depending upon the instantaneous value of the electron beam as it passes over each of the flaps of the mosaic. At the completion of the red video signal a still greater bias voltage is produced by the generating circuit 40 which brings the blue images 32′ down to the position just to one side of the projection lens formerly occupied in succession by the images 30′ and 31′. The blue video signal is then applied to the control electrode 39 and operates in the same manner as the green and red signals to produce a green image on the projection screen.

The operation of the system shown in Fig. 9 may be graphically illustrated by the diagram of Fig. 12. In this diagram brightness of the projected image is represented along the vertical axis and charge on the flaps of the eletrostatic mosaic is represented along the horizontal axis. For the green image the bias applied to the beam intensity control electrode 39 by bias generating circuit 40 is such as to produce an electron beam of such intensity that in the absence of a video signal, the flaps are charged to the point G′. The application of a positive video signal to the control electrode increases this charge with a resulting increase in brightness of the image of the flap on the screen. Maximum brightness is obtained when the video signal is of sufficient amplitude to produce the charge $G_0$. If it is desired to use a negative instead of a positive video signal the bias on the electrode 39 is increased sufficiently to produce a beam intensity that will give a charge G″. The negative video signal then acts to reduce this charge and thereby to increase the illumination. Maximum illumination occurs in this case when the charge has been reduced to $G_0$. In a similar manner the biases for the red and blue signals are selected to produce charges R′ and B′ or R″ and B″ depending upon whether positive or negative video signals are used.

Figures 10, 11:
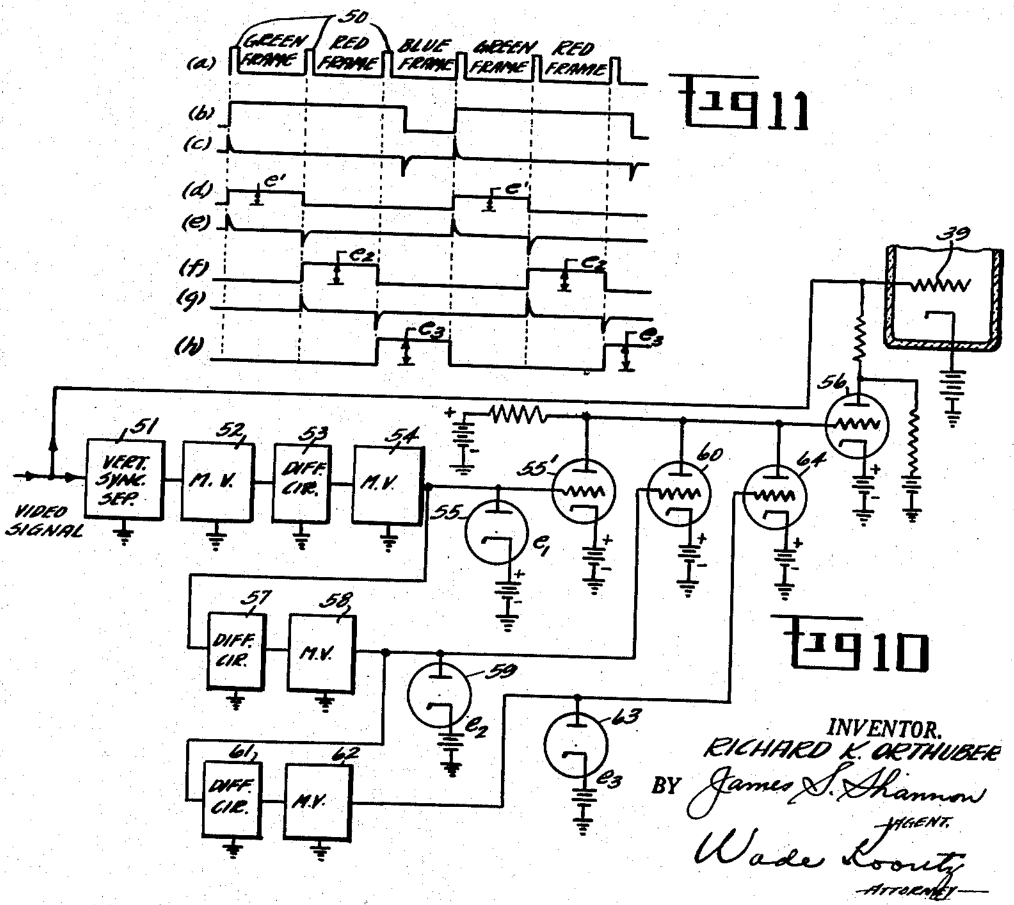
Fig. 10 shows bias voltage generating means for use in the system of Fig. 9.
Fig. 11 is a series of graphs explaining the operation of the circuit of Fig. 10.

The details of a suitable bias voltage generating circuit 40 are shown in Fig. 10, while Fig. 11 shows the wave forms obtained in this circuit for field sequential operation. At (*a*) in Fig. 11 a typical field sequential color television signal is represented. This signal consists of a series of equally spaced vertical synchronizing pulses between which occur in succession the video signals for the green frame, the red frame and the blue frame. Referring to Fig. 10, this video signal is applied to vertical synchronizing signal separator 51 and also to the beam intensity control electrode 39 of the cathode ray tube 1 which corresponds to the cathode ray tube in Fig. 9. The circuit 51 separates the vertical synchronizing signals from video signal and applies them to one-cycle multivibrator 52, which has a period greater than twice the interval between synchronizing pulses and less than three times this interval. The multivibrator is designed to be triggered from one condition of stability to its other condition of stability by a positive pulse received from circuit 51 but to be unaffected by other positive pulses until the circuit has completed a cycle and returned to its first condition of stability. In going through a complete cycle the circuit 52 generates square waves which are illustrated at (*b*) in Fig. 11. As will be seen in this graph one square wave is generated by multivibrator 52 for each complete color picture, or in other words, for each three primary color frames. The square waves produced by circuit 52 are applied to differentiating circuit 53 which produces sharp pulses coincident with the leading and trailing edges of the square wave as shown at (*c*). These trigger pulses are applied to one-cycle multivibrator 54 which is triggered by positive pulses to produce the square waves shown at (*d*) The amplitude of these square voltage waves is determined by the bias voltage $e_1$ connected in series with the clipping diode 55. The square wave output from circuit 54 is applied through isolating tube 55′ and inverting tube 56 to positively bias the beam intensity control electrode 39 of tube 1 to the proper value for the green signal. The period of multivibrator 54 is made exactly equal to the interval between the vertical synchronizing pulses so that the bias is present on grid 39 during the entire transmission time of the green video signal.

The square wave output of the circuit 54 is also applied to differentiating circuit 57 which produces negative trigger pulses from the trailing edges of these waves as shown at (*e*) in Fig. 11. These negative trigger pulses serve to trigger the multivibrator 58 which produces the square waves shown at (*f*) in Fig. 11. These waves have a greater amplitude than those produced by circuit 54 and clipper 55 due to the fact that the bias voltage $e_2$ for clipper 59 has a higher value than the bias voltage $e_1$. The square waves of voltage $e_2$ are applied through isolating stage 60 and inverting stage 56 to the electrode 39 and serve to properly bias this electrode for the red video signal. In a similar manner the square wave output of circuit 58 is differentiated by circuit 61 and the resulting negative pulses shown at (*g*) in Fig. 11 are applied to and serve to trigger the multivibrator 62 which produces the square waves shown at (*h*). These waves are applied to control electrode 39 through isolating tube 64 and inverting stage 56 and serve to properly bias this electrode for the blue video signal.

As already mentioned the period of the multivibrator 52 is greater than two frame periods but less than three-frame periods. Therefore, this multivibrator will return to its original condition of stability some time during the transmisson of the blue vdeo signal. As a result it will be in condition to be triggered into a new cycle of operation by the vertical synchronizing pulse following the blue transmission, as is illustrated at (*b*) in Fig. 11. This initiates a new cycle of operation of the bias voltage generating circuit.

I claim:

1. A system for the optical projection of the picture information in a color video signal, said system comprising: a cathode-ray projection tube having a mosaic comprised of a multitude of similar elemental flat reflectors mounted on and uniformly distributed over a flat substrate, the mounting structure between said reflectors and said substrate being such that the angle between each reflector and said substrate may be varied and such that lines normal to said reflectors always lie in planes parallel to each other and perpendicular to said substrate, said normal lines being parallel to each other when said reflectors are in their rest positions, and means for controlling the angular positions of said reflectors relative to said substrate in accordance with the intensity of a scanning electron beam; a plurality of light sources corresponding in number and color to the colors represented in said video signal; means associated with each light source for forming an image thereof; means positioning said light sources and said image forming means relative to said mosaic so that the optical axes of said image forming means pass through the center of said mosaic and lie in a plane parallel to said planes containing said normal lines, so that said reflectors are evenly illuminated by each light source, so that said optical axes make different angles of incidence with said mosaic and so that the light rays from each source are intercepted by said reflectors prior to the formation of said images, whereby said images are formed by light reflected from said mosaic and are separated in space due to said different angles of incidence; a projection lens, positioned so that its optical axis passes through the center of said mosaic and lies in the plane of the optical axes of said image forming means, for forming an image of the illuminated side of said mosaic on a screen; the focal lengths of said projection lens and said light source image forming means, and the positions of said light sources and associated image forming means relative to said mosaic being chosen so that said projection lens and said images are substantially equidistant from said mosaic; means synchronized with said video signal and operative during the transmission of each color signal thereof for adjusting the cathode-ray tube beam intensity to such value that said reflectors assume the angular position required to bring the image of said light source of corresponding color to a position just outside the acceptance cone of said projection lens; and means for controlling the intensity of said cathode-ray tube beam in accordance with said video signal in such direction that a video signal representing an increasing color intensity causes an increasing portion of said image to fall within said acceptance cone.

2. Apparatus as claimed in claim 1 in which the diameter of said projection lens is approximately equal to the size of said light source images.

3. Apparatus as claimed in claim 1 in which said video signal transmits the three primary colors, red, green and blue, and in which said light sources consist of sources of red, green and blue light.

References Cited in the file of this patent

UNITED STATES PATENTS

| Number | Name | Date |
|---|---|---|
| 2,025,143 | Zworykin | Dec. 24, 1935 |
| 2,202,541 | Okolicsanyi | May 28, 1940 |
| 2,213,060 | Toulon | Aug. 27, 1940 |
| 2,238,137 | Strubig et al. | Apr. 15, 1941 |
| 2,276,359 | Von Ardenne | Mar. 17, 1942 |
| 2,465,898 | Martin | Mar. 29, 1949 |
| 2,528,510 | Goldmark | Nov. 7, 1950 |